United States Patent [19]

Holmbo

[11] Patent Number: 4,860,200

[45] Date of Patent: Aug. 22, 1989

[54] MICROPROCESSOR INTERFACE DEVICE FOR COUPLING NON-COMPATIBLE PROTOCOL PERIPHERAL WITH PROCESSOR

[75] Inventor: Dennis L. Holmbo, Redmond, Oreg.

[73] Assignee: Tektronix, Inc., Beaverton, Oreg.

[21] Appl. No.: 144,609

[22] Filed: Jan. 11, 1988

Related U.S. Application Data

[63] Continuation of Ser. No. 752,226, Jul. 3, 1985, abandoned.

[51] Int. Cl.⁴ ............................................. G06F 13/26
[52] U.S. Cl. ................................. 364/200; 364/238.3; 364/242.6; 364/242.7; 364/240.8; 364/239.7; 364/260
[58] Field of Search ... 364/200 MS File, 900 MS File

[56] References Cited

U.S. PATENT DOCUMENTS

| | | | |
|---|---|---|---|
| 4,048,673 | 9/1977 | Hendrie et al. | 364/200 |
| 4,086,627 | 4/1978 | Bennett et al. | 364/200 |
| 4,106,091 | 8/1978 | Hepworth et al. | 364/200 |
| 4,313,160 | 1/1982 | Kaufman et al. | 364/200 |
| 4,410,962 | 10/1983 | Daniels et al. | 364/900 |
| 4,418,382 | 11/1983 | Larson et al. | 364/200 |
| 4,504,901 | 3/1985 | Caluignac et al. | 364/200 |
| 4,716,525 | 12/1987 | Gilanyi et al. | 364/200 |
| 4,787,029 | 11/1988 | Khan | 364/200 |
| 4,805,090 | 2/1989 | Coogan | 364/200 |
| 4,813,011 | 3/1989 | Kulakowski et al. | 364/900 |

OTHER PUBLICATIONS

SCSI Bus Solves Peripheral Interface Problem; Barrett, Richard; Mini-Micro Systems; May 1984.

*Primary Examiner*—Eddie P. Chan
*Assistant Examiner*—Rebecca L. Rudolph
*Attorney, Agent, or Firm*—John Smith-Hill; Francis I. Gray; William K. Bucher

[57] ABSTRACT

A device for rendering a data source compatible with a processor having a predetermined protocol for receiving information from peripheral devices, comprises a controller for receiving information from the data source and conducting the protocol with the processor to place the processor in a condition for receiving the information. A latch receives information from the controller and makes the information available to the processor when the processor is in a condition for receiving information.

2 Claims, 5 Drawing Sheets

MICROPROCESSOR INTERFACE DEVICE FOR COUPLING NON-COMPATIBLE PROTOCOL PERIPHERAL WITH PROCESSOR

This is a continuation of application Ser. No. 752,226 filed Jul. 3, 1985, and now abandoned.

This invention relates to microprocessor interface devices.

BACKGROUND OF THE INVENTION

The Z80 family of integrated circuits manufactured by Zilog, Inc. includes not only the Z80 microprocessor (which designation is used herein to denote the original Z80 microprocessor and, except where the context might otherwise require, subsequent versions such as the Z80A and Z80H) but also peripheral devices such as the Z80 SIO (serial input/output), the Z80 PIO (parallel input/output) and the Z80 CTC (counter-timer). The different peripheral devices are specifically designed to function with the Z80 microprocessor and to be connected to the data bus of the Z80.

It is well understood that a microprocessor operates by executing a sequence of instructions. From time to time, it may be desirable to interrupt a particular operation to perform an interrupt routine, and upon completion of the interrupt routine the microprocessor resumes the interrupted operation. The Z80 executes each instruction cycle in one or more machine cycles. Each instruction cycle includes at least one op code fetch cycle (M1). During the last machine cycle of each instruction, the microprocessor samples its /INT pin, and if the /INT pin is low the microprocessor completes its current instruction cycle and then enters a special M1 state, in which its /M1 pin goes low. While the /M1 pin remains low, the /IORQ pin also goes low, and the coincidence of /M1 and IORQ both being low constitutes an interrupt acknowledge cycle. The interrupt acknowledge cycle indicates that the Z80 is ready to service an interrupt. The Z80 has three possible interrupt modes, the most flexible of which is known as the mode 2 interrupt. In the mode 2 interrupt, the peripheral places an address vector on the data bus, and the CPU addresses the memory location defined by the address vector and executes the interrupt routine stored at that location.

If there is more than one peripheral connected to the Z80 data bus, the several peripherals may be connected in a so-called daisy chain. Each of the Z80 peripherals has an interrupt enable in (IEI) pin and an interrupt enable out (IEO) pin, and the peripheral devices are arranged hierarchically with the IEO pin of the device that is higher in the hierarchy connected to the IEI pin of the next lower device. In a conventional daisy chain, the IEI pin of the highest order device is tied to logical 1. When a peripheral device receives logical 1 at its IEI pin and does not itself wish to make an interrupt, it provides logical 1 at its IEO pin, thus applying logical 1 to the IEI pin of the next lower device in the daisy chain. In order to perform an interrupt, a peripheral device must receive logical 1 at its IEI pin and must detect an interrupt acknowledge cycle from the Z80. During the interrupt acknowledge cycle, the peripheral removes the logical 0 from its /INT pin, letting that pin go high, and places a vector on the data bus.

Hitherto, it has not been possible for devices other than peripheral devices in the Z80 family to interact with a Z80 microprocessor through its interrupt capability. This implies that if it is desired that a non-Z80 peripheral device should interact with a Z80 microprocessor, it must do so through a Z80 peripheral device, and therefore the output of the non-Z80 peripheral device must conform to the input requirements of the Z80 peripheral device. Moreover, use of an additional peripheral device may cause delay in executing the interrupt routine.

SUMMARY OF THE INVENTION

A data source is rendered compatible with a processor having a predetermined protocol for receiving information from peripheral devices by interposing a controller and a latch between the data source and the processor. The controller receives information from the data source and conducts a protocol with the processor to place the processor in a condition for receiving information, and the latch receives information from the controller and makes the information available to the processor when the processor is in a condition for receiving information.

In a preferred embodiment of the invention, the processor is a Z80 microprocessor and the data source is a non-Z80 co-processor. The controller makes the data source appear to the Z80 microprocessor to be a Z80 peripheral device.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
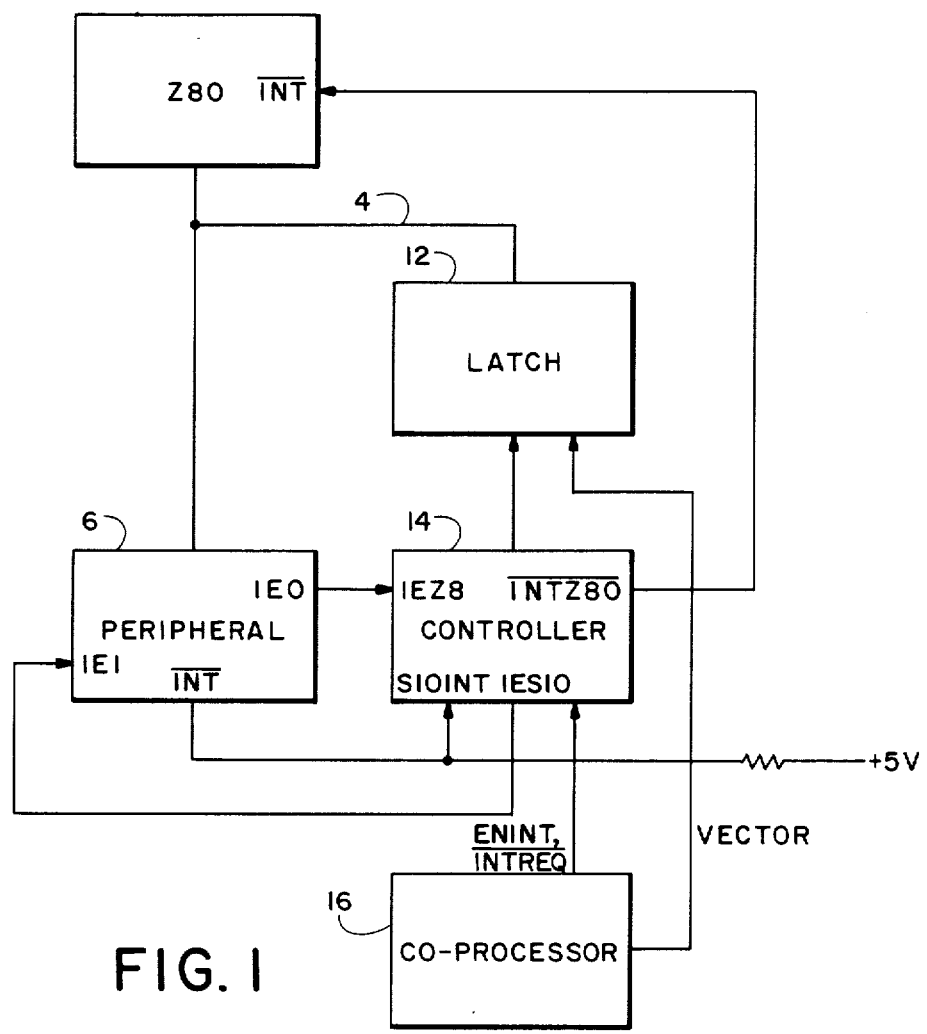
FIG. 1 is a block diagram of a first microprocessor and co-processor system embodying the present invention.
Figure 2:
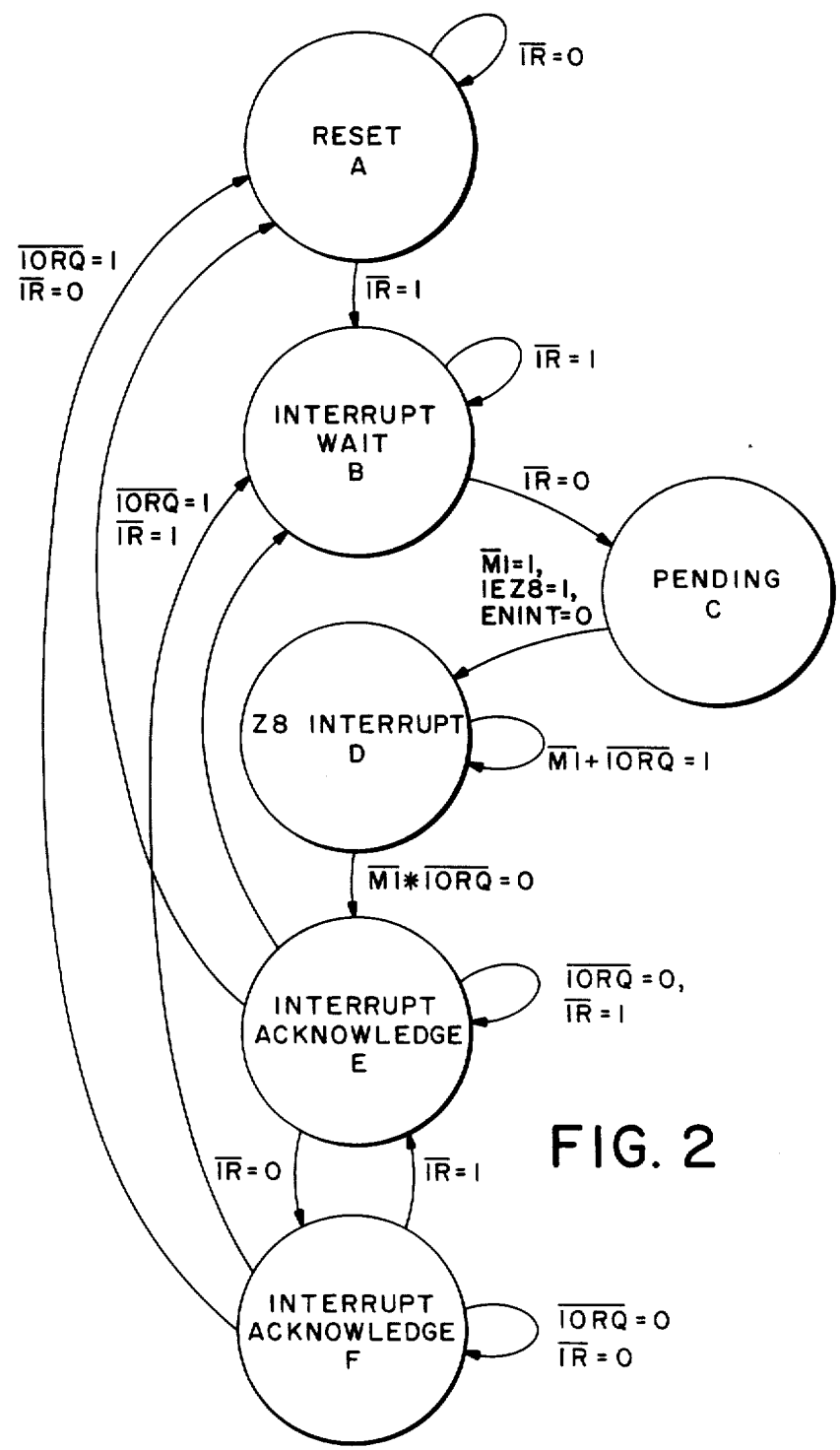
FIG. 2 is a state diagram of a component of the FIG. 1 system.

The apparatus shown in FIG. 1 of the drawings comprises a Z80H central processing unit 2 having a data bus 4 to which a Z80 SIO peripheral 6 is connected. Also connected to the data bus 4, through a co-processor vector latch 12, is an interrupt controller 14. A Z8 co-processor 16 is connected to the controller 14. The peripheral 6 and the interrupt controller 14 are connected together in daisy chain fashion, with the IEO pin of the peripheral 6 connected to apply a signal IE Z8 to the controller. The interrupt controller 14 is a programmable logic array (PAL) that functions as a state machine having the states shown in FIG. 2. The co-processor has two general-purpose output pins, designated /INTREQ and ENINT in this specification, and the co-processor can place either pin in a logical 0 or logical 1 state independently of the other pin. The pin /INTREQ (abbreviated to /IR in FIG. 2) is a Z8 interrupt request pin. The pin ENINT is an SIO interrupt enable pin, and a logical 1 on the pin enables the peripheral to request an interrupt. If a logical 0 is placed on the pin ENINT, the controller blocks the pin SIOINT and prevents a logical 0 received at that pin from being passed to the /INT pin of the Z80 by way of the pin /INTZ80. If a logical 1 is placed on the pin /INTREQ, the controller blocks the pin SIOINT and holds the pin IESIO low, thus disabling the peripheral 6. Both ENINT and IESIO must be at logical 1 in order for a logical 0 at the pin SIOINT to cause the pin /INTZ80 to go to logical 0.

If the co-processor 16 requires an interrupt, it may be either a priority interrupt, which takes priority over an interrupt request by the peripheral 6, or a non-priority interrupt, which yields priority to a request by the peripheral 6.

If the co-processor does not require a priority interrupt (i.e. it either does not require an interrupt or it requires a non-priority interrupt) the pin ENINT is held high, and the controller 14 provides a logical 1 at its pin IESIO. If the peripheral 6 requires an interrupt, its pin /INT is placed at logical 0 and this logical 0 is applied to the pin SIOINT of the controller 14. In response to the logical 0 at the pin SIOINT, the controller generates a logical 0 at its pin INTZ80, taking the pin /INT of the Z80 to logical 0. The peripheral 6 generates a logical 0 at its pin IEO, temporarily disabling the controller from responding to an interrupt request by the co-processor the co-processor takes its pin ENINT to logical 0. When the Z80 enters the interrupt acknowledge cycle (both /M1 and /IORQ go to logical 0) the peripheral 6 responds by placing its interrupt vector on the data bus 4.

If the peripheral 6 does not require an interrupt but the co-processor 16 requires a non-priority interrupt, the controller receives a logical 1 from the IEO pin of the peripheral 6.

The procedure that is followed when the coprocessor requires an interrupt will now be described with reference to FIG. 2 and FIGS. 3A, 3B and 3C.

Prior to requesting an interrupt (and at a time that is not controlled by the controller) the Z8 co-processor loads an interrupt vector into the latch 12. The vector that is loaded into the latch depends on the nature of the interrupt routine that is called for by the co-processor.

Assuming that the controller is initially in the interrupt wait state B, the controller will remain in that state so long as the pin /INTREQ of the co-processor is high. When the co-processor requires an interrupt, the pin /INTREQ goes to logical 0, and the controller changes to an interrupt pending state C. The controller remains in the state C until the signal /M1 provided by the Z80 processor is high (indicating that the Z80 processor can receive an interrupt request) and either IEZ8 is high (indicating that the peripheral 6 does not require an interrupt) or ENINT is low (indicating that interrupt requests from the peripheral have been blocked). (When /ENINT is at logical 0, the controller prevents a logical 0 received from the peripheral on the pin SIOINT from being passed to the processor 2.) When the system is ready for an interrupt (signified by /M1=1 and (IEZ8=1 or ENINT=0)), the controller advances to the Z8 interrupt state D, and remains in that state so long as either /M1 or /IORQ is 1. In the state D, the controller takes the pin /INTZ80 low, thus making an interrupt request to the main processor. Also, the pin IESIO is taken low, disabling the peripheral 6 from requesting an interrupt. When both /M1 and /IORQ become 0, indicating the interrupt acknowledge cycle, the controller changes to one of two interrupt acknowledge states E and F in which the controller waits for the signal /IORQ to become 1. In whichever of the interrupt acknowledge states is entered, the controller causes the latch 12 to place the vector that was previously loaded by the co-processor on the bus 4, and the processor 2 then executes the interrupt routine.

The first interrupt acknowledge state E is associated with /INTREQ being 1, and the second state F is associated with /INTREQ being 0. Thus, if /IORQ and /M1 both become 0 and /INTREQ is 0, the controller does not remain in the state E but immediately jumps to the state F. When the signal IORQ becomes 1, the controller changes to a reset state A or the wait state B depending on whether INTREQ is 0 or 1. If /INTREQ was at logical 0, so that the controller passed to the reset state A, the peripheral 6 is disabled from requesting an interrupt because in the state A the controller holds its pin IESIO low. On power up, the controller is automatically placed in the reset state A, and it cannot advance to the interrupt wait state B until /INTREQ changes to logical 1. By providing two distinct states A and B, the controller can be made to pass directly from an interrupt acknowledge state E or F to the interrupt wait state B, without passing through the reset state A, on change of only one bit (/IORQ from logical 0 to logical 1) provided that the condition to enter state B from state A (/INTREQ at logical 1) is satisfied.

Since the pin /INTREQ of the co-processor is a general purpose pin, it may be placed either at logical 1 or logical 0 on power up. If /INTREQ were at logical 0, this would not represent a genuine interrupt request, and it is not desirable that the main processor should service a spurious interrupt request. By providing the reset state A, which is automatically entered on power up, and ensuring that the state B is entered only when INTREQ=1 has been detected and a transition to INTREQ=0 occurs, the possibility of the main processor's servicing a spurious interrupt request is avoided. Also, in order to prevent interrupts after the Z80 has entered the interrupt acknowledge cycle, the co-processor may hold the pin /INTREQ low, so that after state D the controller passes to the reset state A and this disables the peripheral from requesting an interrupt.

Figure 3A:
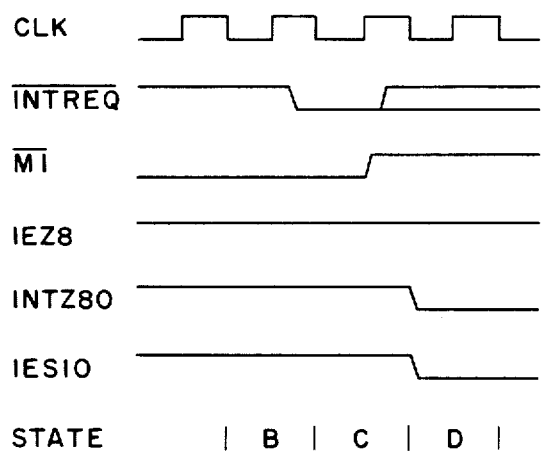
FIGS. 3A, 3B and 3C are timing diagrams.

The timing of the interrupt operation is shown in FIG. 3A. If /INTREQ goes low when the controller is in the state B, the controller passes to the state C on the next falling clock edge, and on the next rising clock edge the controller passes to the state D and places a logical 0 on the pin INTZ80 and a logical 0 on the pin IESIO. The logical 0 on INTZ80 is applied to the pin /INT of the Z80, and the logical 0 on the pin IESIO disables the peripheral 6. The signal /INTREQ may change to 1 or remain at 0. The interrupt then proceeds in the manner described.

Figure 3B:
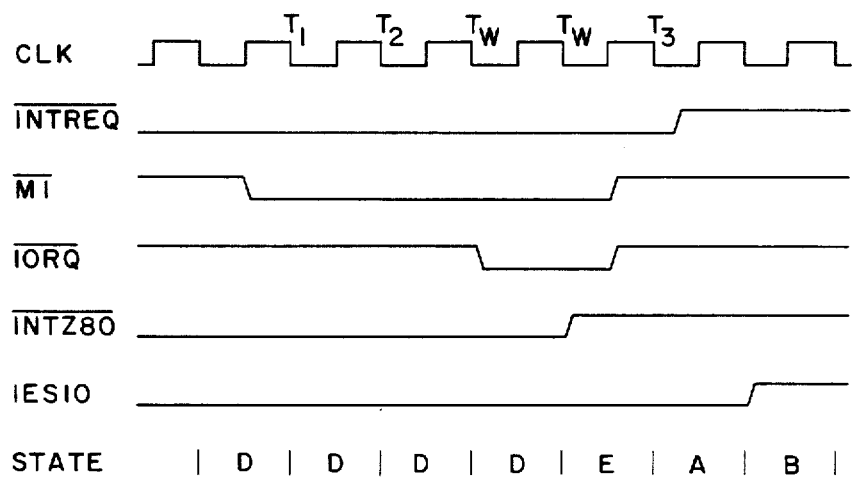
Figure 3C:
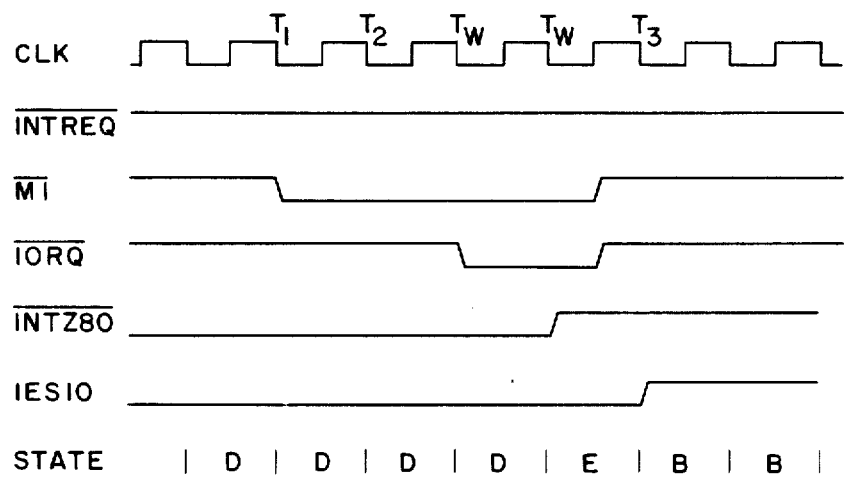

The timing of the acknowledgement by the Z80 of the Z8 interrupt is shown in FIGS. 3B and 3C. In the Z80, simultaneous presence of 0's on /IORQ and /M1 represents the interrupt acknowledge cycle, and is recognized as such by the controller. The pin /M1 goes to 0 on a rising clock edge, and three falling clock edges later /IORQ goes to 0. Upon recognizing the interrupt acknowledge, the controller takes /INTZ80 low and its state changes to E. On the next rising clock edge, /M1 and /IORQ go to 1, confirming receipt of /INTZ80=1. If /INTREQ was low, it goes high on the next rising clock edge and interrupts by the peripheral 6 are blocked until this occurs. IESIO accordingly goes high on the next falling clock edge, and the controller is placed in state B. If at the time that /INTZ80 went high, /INTREQ was already high, /INTREQ remains high. FIGS. 3B and 3C distinguish between the cases when /INTREQ is low (FIG. 3B) and high (FIG. 3C) at the time of interrupt acknowledge. In the case of FIG. 3B, the peripheral SIO is disabled from requesting an interrupt until /INTREQ passes to logical 1 and causes the controller to pass from the state A to the state B.

The interrupt controller 14 and the latch 12 together convert the output received from the coprocessor 16 into a form that is compatible with the interrupt structure of the Z80 processor, i.e. the controller 14 and the latch 12 make the coprocessor 16 look like a Z80 family peripheral to the Z80 processor. In addition, the interrupt controller is able to adjust the priorities of the co-processor 16 and the other devices in the daisy chain.

The controller 14 and the co-processor 16 establish priorities for interrupts by the coprocessor and the peripheral 6. If ENINT is high, and the peripheral is interrupting or an interrupt by the peripheral is being serviced, the peripheral holds the pin IEZ8 low, and therefore the controller cannot enter its Z8 interrupt state D. If IEZ8 is high, indicating that the peripheral is not interrupting or having an interrupt serviced, the controller can enter the state D regardless of the level of ENINT, and if ENINT is low, the peripheral 6 is disabled and the controller can enter the state D regardless of the level of IEZ8.

Figure 4:
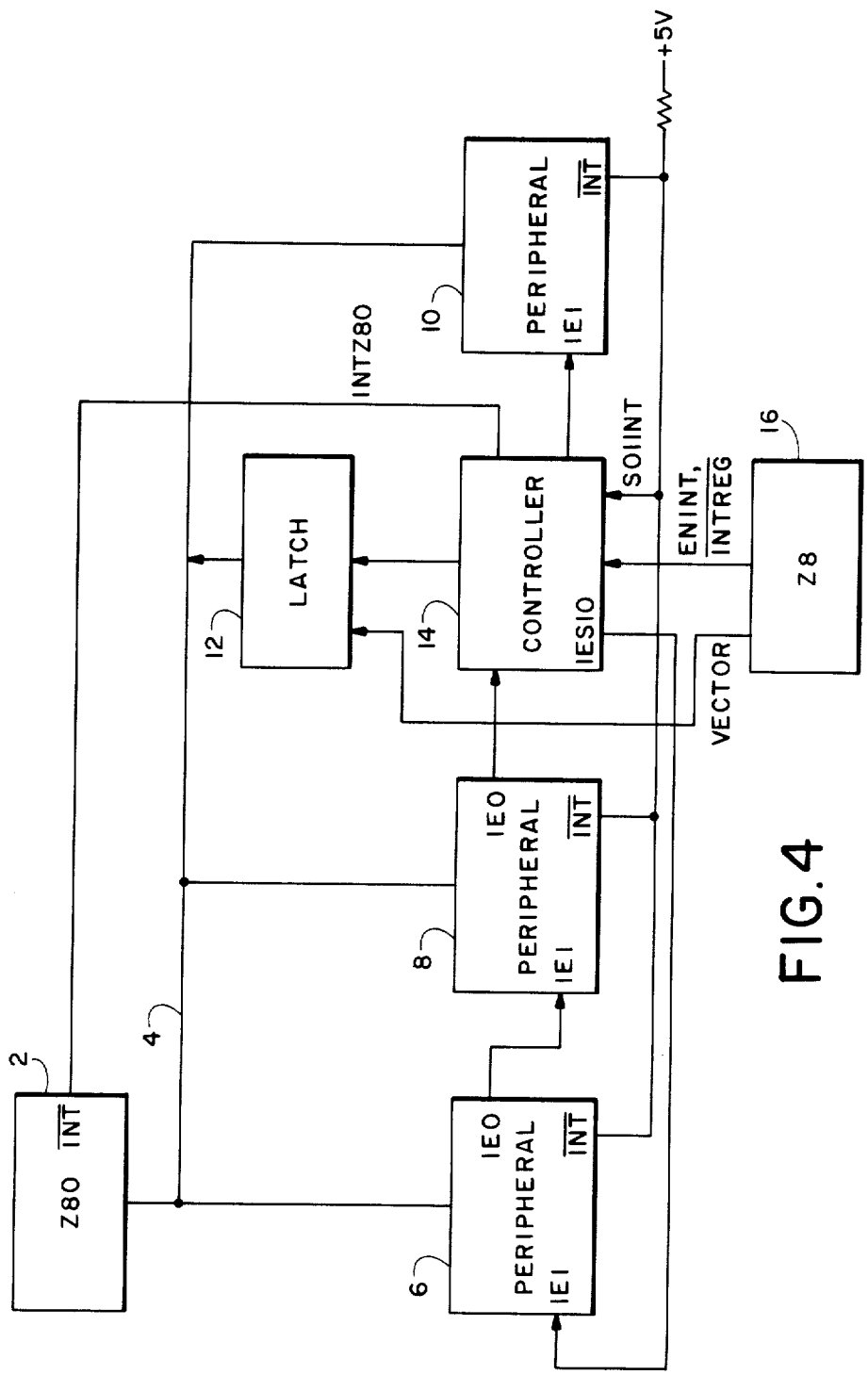
FIG. 4 is a block diagram of a second system embodying the present invention.

The basic principle of the system shown in FIG. 1 may be applied to a daisy chain having more than two members. FIG. 4 shows a system in which the daisy chain has four members (including the coprocessor 16). The two additional Z80 peripherals 8 and 10 are positioned one higher and one lower than the co-processor in the chain. When the coprocessor receives a logical 1 at its pin IEZ8 and does not itself require an interrupt, it applies a logical 1 to the pin IEI of the peripheral 10 and thus enables that peripheral to effect an interrupt, whereas if the co-processor requires an interrupt it applies a logical 0 to the pin IEI of the peripheral 10.

It will be appreciated that the invention is not restricted to the particular embodiment that has been described and illustrated, and that variations may be made therein without departing from the scope of the invention as defined in the appended claims, and equivalents thereof.

I claim:

1. A device for rendering a data source in a daisy chain of peripheral devices compatible with a processor having a predetermined protocol for receiving information from the peripheral devices comprising:

an interrupt controller having a first interrupt input from one of the peripheral devices in the daisy chain and a second interrupt input from the data source, the first interrupt input indicating whether an interrupt is being processed by one of the peripheral devices higher in hierarchy in the daisy chain and the second interrupt input indicating whether the data source has information for the processor and the priority of such information, and having an interrupt request output to the processor and an interrupt inhibit output to the first peripheral device in the daisy chain, the interrupt request output indicating to the processor according to the protocol that one of the peripheral devices, including the data source, has information and the interrupt inhibit output disabling the peripheral devices higher in hierarchy when the information from the data source has a high priority; and a vector latch for receiving an interrupt vector from the data source for transmittal to the processor, the vector latch transmitting the interrupt vector to the processor upon command from the interrupt controller.

2. An improved microprocessor system of the type having a processor coupled to a data bus, the processor having an interrupt input, and a plurality of compatible peripherals coupled to the data bus, the compatible peripherals each having an interrupt indicator output, an interrupt output and an interrupt enable input and being connected in an interrupt daisy chain such that the interrupt output of one compatible peripheral is connected to the interrupt enable input of the next compatible peripheral in the daisy chain, the interrupt output of the last compatible peripheral in the daisy chain being connected to the interrupt input of the processor, and the interrupt indicator outputs being connected together, the improvement comprising:

a latch coupled to the data bus;

an interrupt controller connected in the daisy chain and having an controller interrupt enable input connected to the interrupt output of one of the compatible peripherals, an interrupt indicator input connected to the interrupt indicator outputs, a processor interrupt output connected to the interrupt input of the processor with the interrupt output of the last compatible peripheral being disconnected from the interrupt input of the processor, a controller interrupt output connected to the next compatible peripheral in the daisy chain, a command output connected to the latch for transferring a data vector stored in the latch to the data bus for the processor, and a priority inhibit line connected to the interrupt enable input of the first compatible peripheral in the daisy chain; and a non-compatible peripheral having a priority status line and an interrupt request line connected to the interrupt controller, and having a data vector line connected to the latch for transferring an interrupt data vector from the non-compatible peripheral to the latch for transmission as the data vector to the processor;

whereby when the priority line is enabled only an interrupt request from the non-compatible peripheral is processed by the processor, and when the priority line is disabled the highest interrupt request from all of the peripherals in the daisy chain, including the non-compatible peripheral, is processed by the processor.

* * * * *